UNITED STATES PATENT OFFICE 2,103,269

AZO COMPOUNDS AND PROCESS FOR DYEING THEREWITH

James G. McNally and Joseph B. Dickey, Rochester, N. Y., assignors to Eastman Kodak Company, Rochester, N. Y., a corporation of New Jersey No Drawing. Application January 14, 1937, Serial No. 120,556

20 Claims. (Cl. 8—5)

This invention relates to aromatic azo compounds. More particularly it relates to nuclear non-sulfonated aromatic azo compounds suitable for the coloration of organic derivatives of cellulose. The invention includes the azo compounds, the process for their preparation, the process of coloring with them and materials colored with the azo compounds of the invention.

Organic derivatives of cellulose are characterized by an indifferent affinity for the usual cotton or wool dyes, especially the ordinary water-soluble dyes. Typical organic derivatives of cellulose include the hydrolyzed, as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have found that a valuable series of azo compounds can be prepared by diazotizing an aromatic amine and coupling in an alkaline medium with a barbituric acid compound, namely, 2-iminobarbituric acid or 2-alkyliminobarbituric acid, having the following formula:

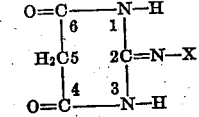

wherein X represents hydrogen or an alkyl group. In this connection it should be noted that the term "alkyl" is intended to include non-substituted alkyl groups, such as methyl, ethyl, propyl, etc., as well as substituted alkyl groups, except as otherwise indicated, such as $C_2H_4OH$, $C_3H_6OH$ and $C_2H_4Cl$, for example.

The compounds of our invention which may be obtained as above described may be represented by the following general formula:

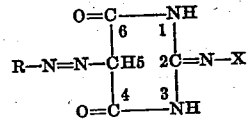

wherein X has the meaning above given and R is an aromatic nucleus which may be substituted or unsubstituted. Advantageously, R is an aryl nucleus of the benzene series.

The compounds of our invention constitute valuable dyes. The nuclear non-sulfonated aromatic azo compounds of the invention may be employed for the dyeing or coloration of materials made of or containing organic derivatives of cellulose. The dyeings produced employing said nuclear non-sulfonated azo compounds are in general of good fastness to light and washing, and range in shade from greenish-yellow to red. The nuclear sulfonated azo compounds possess little or no utility for the coloration of organic derivatives of cellulose, but may be employed for the coloration of cotton, natural silk or wool by customary methods of application.

The following examples illustrate the method of preparation of the azo compounds of our invention. Quantities are expressed in parts by weight.

Example 1

13.7 parts of o-phenetidine are dissolved in 200 parts of water containing about 30 parts of 36% hydrochloric acid. The resulting solution is cooled to a temperature approximating 0-5° C. by the addition of ice, for example, and diazotized in the usual manner by the addition of 6.9 parts of sodium nitrite dissolved in water.

12.7 parts of 2-iminobarbituric acid are dissolved in 300 parts of water containing 31.8 parts of sodium carbonate and coupled in the usual manner with the diazonium solution prepared above. Upon completion of the coupling reaction, the mixture is made acid to litmus with acetic acid and the precipitated azo compound is filtered, washed with water, and dried.

Example 2

16.8 parts of 2-methoxy-4-nitroaniline are added to 200 parts of water containing about 36 parts of 36% hydrochloric acid. The mixture is iced and diazotized in the usual manner by adding with stirring 6.9 parts of sodium nitrite dissolved in water.

14 parts of 2-methyliminobarbituric acid are dissolved in 300 parts of water containing 31.8 parts of sodium carbonate. The resulting solution is cooled and the diazo solution prepared as described above is added with stirring. When coupling is complete, the mixture is made acid to litmus with acetic acid and the precipitated dye compound is filtered, washed with water, and dried.

Example 3

34.7 parts of disodium-2-aminonaphthalene-4,8-disulfonate are dissolved in 200 parts of water. The solution is well iced and about 59.5 parts of 36% hydrochloric acid are then added with vigorous stirring. The resulting solution is then diazotized by the gradual addition of 6.9 parts of a concentrated water solution of sodium nitrite with stirring.

12.7 parts of 2-iminobarbituric acid are dissolved in 300 parts of water containing 31.8 parts of sodium carbonate and coupled in the usual manner with the diazo solution prepared as described above. Upon completion of the coupling reaction, the desired azo dye compound is precipitated out by the addition of sodium chloride, after which it is recovered by filtration, washed with water, and dried.

This sulfonated dye compound is not suitable for coloring organic derivatives of cellulose but may be employed for the coloration of cotton, natural silk or wool by customary methods of application.

Example 4

13.6 parts of p-aminodimethylaniline are dissolved in 200 parts of water containing about 47.6 parts of 36% hydrochloric acid and diazotized in the usual manner by the addition of 6.9 parts of sodium nitrite dissolved in water.

12.7 parts of 2-iminobarbituric acid are dissolved in 300 parts of water containing 31.8 parts of sodium carbonate. The resulting solution is cooled and the diazo solution prepared as described above slowly added with stirring. When coupling is complete, the mixture is made slightly acid to litmus with acetic acid and the desired azo compound is recovered by filtration, washed with water, and dried.

Example 5

15.8 parts of 2-nitro-4-chloroaniline are added to 200 parts of water containing about 36 parts of 36% hydrochloric acid. The mixture is iced and diazotized in the usual manner by adding with stirring 6.9 parts of sodium nitrite dissolved in water.

14.1 parts of 2-methyliminobarbituric acid are dissolved in 300 parts of water containing 30 parts of sodium carbonate. The resulting solution is cooled by the addition of ice, for example, and the diazo solution prepared as described above is added with stirring. When coupling is complete, the mixture is made neutral to Congo red paper by the addition of acetic acid and the desired azo compound is recovered by filtration, washed with water, and dried.

Example 6

15.4 parts of 4-methoxy-2-nitroaniline are diazotized and coupled with 15.9 parts of 2-ethyliminobarbituric acid dissolved in a dilute aqueous solution of sodium carbonate. The dye compound formed is recovered by filtration and subjected to any further treatment desired.

2-β-hydroxyethyliminobarbituric acid, for example, may be substituted for 2-ethyliminobarbituric acid in the above example.

In order that our invention will be fully set forth, the preparation of a number of substances employed in the manufacture of the compounds of the invention is described hereinafter.

Preparation of 2-methyliminobarbituric acid

To a solution of 9 grams of sodium in 150 cc. of dry ethanol are added 36 grams of diethylmalonate and 23.4 grams of methyliminourea (methyl guanidine) carbonate. The mixture is refluxed for 5 hours, after which it is filtered and the precipitate washed with a small amount of ethanol. The sodium salt thus obtained is dissolved in a small volume of water and the resulting solution acidified to Congo red paper by the addition of hydrochloric acid. 2-methyliminobarbituric acid separates on cooling and is recovered by filtration, washed and dried.

Preparation of 2-iminobarbituric acid

This compound can be prepared as described in Liebig's Annalen, vol. 335, page 352 (1904) or Berichte der Deutschen Chemischen Gesellschaft, vol. 26, page 2553 (1893).

Preparation of 2-ethyliminobarbituric acid

To a solution of 9 grams of sodium in 150 cc. of dry ethanol are added 36 grams of ethyl malonate and 26.5 grams of ethyliminourea carbonate (ethyl guanidine). The mixture is refluxed for 5 hours, after which it is filtered and the precipitate washed with ethyl alcohol. The sodium salt thus obtained is dissolved in a small volume of water, and the resulting solution acidified to Congo red paper by means of hydrochloric acid to precipitate 2-ethyliminobarbituric acid. The desired product separates on cooling and is recovered by filtration, washed and dried.

Ethyliminourea carbonate may be prepared as described in Science Papers Institute Physical Chemical Research (Tokyo), vol. 16, pages 306–309, 24–28 (1931).

Preparation of 2-β-hydroxy ethyliminobarbituric acid

To a solution of 9 grams of sodium in 150 cc. of dry ethanol are added 36 grams of ethyl malonate and 29.2 grams of β-hydroxy ethyliminourea carbonate (prepared as described in the above reference). The mixture is refluxed for 5 hours, after which it is filtered and the precipitate washed with ethyl alcohol. The sodium salt thus obtained is dissolved in a small volume of water and the resulting solution acidified to Congo red paper by means of hydrochloric acid to precipitate 2-β-hydroxyethyliminobarbituric acid. The desired product separates on cooling and is recovered by filtration, washed and dried.

The following tabulation further illustrates the compounds included within the scope of our invention, together with the color they produce on cellulose acetate silk. The compounds indicated below may be prepared by diazotizing the amines listed under the heading "Amine" and coupling with the compounds specified in the column entitled "Coupling component." The diazotization and coupling reactions may, for example, be carried out in accordance with the general procedure disclosed in Examples 1–6, inclusive, illustrating the preparation of the compounds of our invention.

| Coupling component | Amine | Color on cellulose acetate silk |
|---|---|---|
| 2-Iminobarbituric acid | o-Anisidine | Greenish-yellow. |
| Do | p-Anisidine | Do. |
| Do | p-Nitroaniline | Golden yellow. |
| Do | o-Nitroaniline | Yellow. |
| Do | m-Nitroaniline | Do. |
| Do | o-Methoxy-p-nitroaniline | Golden yellow. |
| Do | o-Chloroaniline | Greenish-yellow. |
| Do | p-Aminodimethylaniline | Red. |
| 2-Methyliminobarbituric acid | o-Anisidine | Greenish-yellow. |
| Do | o-Methoxy-p-nitroaniline | Golden yellow. |

In employing the aromatic azo derivatives of our invention as dyes, they will ordinarily be applied to the material in the form of an aqueous suspension which can be prepared by grinding the dye to a paste in the presence of a sulfonated oil, soap or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dye bath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. Those amounts are not to be taken as limits as greater or lesser amounts can be used. To illustrate, if the dye is ground to a sufficiently fine powder dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing, the amine is absorbed and diazotized on the fiber, after which the dye is formed in situ by developing with 2-iminobarbituric acid or 2-alkyliminobarbituric acid. Conversely, the material undergoing dyeing may first be treated to absorb 2-iminobarbituric acid or 2-alkyliminobarbituric acid, and the dye subsequently formed in situ by coupling with an aryl diazonium salt.

The following example illustrates one satisfactory way in which dyeing may be carried out in accordance with our invention:

Example 7

2.5 parts of the compound formed by coupling 2-iminobarituric acid with o-phenetidine in an alkaline medium are finely ground with soap and dispersed in 1000 parts of water. The dispersion thus prepared is heated to a temperature approximating 45–55° C. and 100 parts of cellulose acetate silk, in the form of taffeta or threads, for example, are added to the dye bath, after which the temperature is gradually raised to 80–85° C. and the silk worked for several hours at this latter temperature. Upon completion of the dyeing operation, the cellulose acetate silk is removed, washed with soap, rinsed and dried. The cellulose acetate silk is dyed a greenish-yellow shade.

While our invention has been illustrated in connection with the dyeing of cellulose acetate silk it will be understood that dyeing operations can be carried out in a manner similar to that described above by the substitution of another organic derivative of cellulose material for cellulose acetate silk or by employing a dye compound of the invention other than that employed in the example, or by substitution of both the material being dyed and the dye compound of the example.

We claim:

1. An aromatic azo derivative of a compound selected from the group consisting of 2-iminobarbituric acid and 2-alkyl-iminobarbituric acid.

2. An aromatic azo derivative of 2-iminobarbituric acid.

3. An azo compound having the general formula:

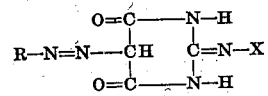

wherein X represents hydrogen or an alkyl group and R represents an aromatic nucleus.

4. An azo compound having the general formula:

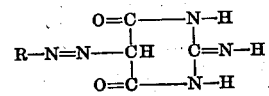

wherein R represents a nuclear non-sulfonated aryl nucleus of the benzene series.

5. An azo compound having the general formula:

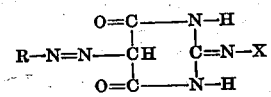

wherein X represents an alkyl group and R represents a nuclear non-sulfonated aryl nucleus of the benzene series.

6. An azo compound having the formula:

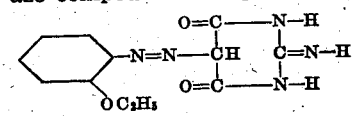

7. An azo compound having the formula:

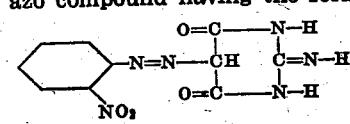

8. An azo compound having the formula:

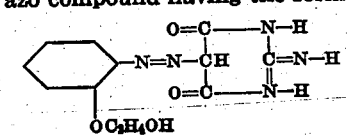

9. A process of coloring an organic derivative of cellulose which comprises applying thereto a dye selected from the class of azo compounds having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents a nuclear non-sulfonated aromatic nucleus.

10. A process of coloring an organic derivative of cellulose which comprises applying thereto a dye selected from the class of azo compounds having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents a nuclear non-sulfonated aryl nucleus of the benzene series.

11. A process of coloring an organic acid ester of cellulose which comprises applying thereto a dye selected from the class of azo compounds having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents a nuclear non-sulfonated aromatic nucleus.

12. A process of coloring an organic acid ester of cellulose which comprises applying thereto a dye selected from the class of azo compounds having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents a nuclear non-sulfonated aryl nucleus of the benzene series.

13. A process of coloring a cellulose acetate which comprises applying thereto a dye selected from the class of azo compounds having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents a nuclear non-sulfonated aromatic nucleus.

14. A process of coloring a cellulose acetate which comprises applying thereto a dye selected from the class of azo compounds having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents a nuclear non-sulfonated aryl nucleus of the benzene series.

15. A process of coloring a cellulose acetate which comprises applying thereto a dye selected from the class of azo compounds having the general formula:

$$\begin{array}{c} O=C\text{———}N-H \\ R-N=N\text{———}CH \quad C=N-H \\ O=C\text{———}N-H \end{array}$$

wherein R represents a nuclear non-sulfonated aryl nucleus of the benzene series.

16. Material containing an organic derivative of cellulose colored with an azo compound having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents an aromatic nucleus.

17. Material containing an organic acid ester of cellulose colored with an azo compound having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents an aromatic nucleus.

18. Material containing an organic acid ester of cellulose colored with an azo compound having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents an aryl nucleus of the benzene or naphthalene series.

19. A cellulose acetate colored with an azo compound having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents an aromatic nucleus.

20. A cellulose acetate colored with an azo compound having the general formula:

$$\begin{array}{c} O=C\text{———}N-H \\ R-N=N\text{———}CH \quad C=N-X \\ O=C\text{———}N-H \end{array}$$

wherein X represents hydrogen or an alkyl group and R represents an aryl nucleus of the benzene series.

JAMES G. McNALLY.
JOSEPH B. DICKEY.